United States Patent
Wunderlich et al.

[11] Patent Number: 6,065,122
[45] Date of Patent: May 16, 2000

[54] SMART BATTERY POWER MANAGEMENT IN A COMPUTER SYSTEM

[75] Inventors: Russ Wunderlich, Turnwater, Wash.; Kamran Khederzadeh, Houston; Todd J. Deschepper, Spring, both of Tex.

[73] Assignee: Compaq Computer Corporation, Houston, Tex.

[21] Appl. No.: 09/042,277

[22] Filed: Mar. 13, 1998

[51] Int. Cl.[7] ............................................. G06F 1/00
[52] U.S. Cl. .............................. 713/320; 710/2; 710/101; 710/260; 710/266; 713/300; 713/322; 713/323; 713/324; 713/400; 713/500
[58] Field of Search ............................. 710/2, 260, 266, 710/101; 713/300, 320, 322, 323, 324, 400, 500

[56] References Cited

U.S. PATENT DOCUMENTS

| | | | |
|---|---|---|---|
| 5,203,003 | 4/1993 | Donner | 713/322 |
| 5,241,680 | 8/1993 | Cole et al. | 713/322 |
| 5,404,544 | 4/1995 | Crayford | 713/300 |
| 5,546,568 | 8/1996 | Bland et al. | 713/501 |
| 5,553,276 | 9/1996 | Dean | 713/400 |
| 5,625,807 | 4/1997 | Lee et al. | 713/601 |
| 5,692,197 | 11/1997 | Narad et al. | 713/300 |
| 5,748,911 | 5/1998 | Maguire et al. | 710/101 |
| 5,754,798 | 5/1998 | Uehara et al. | 710/104 |
| 5,761,517 | 6/1998 | Durhan et al. | 713/322 |
| 5,774,704 | 6/1998 | Williams | 713/501 |
| 5,796,992 | 8/1998 | Reif et al. | 713/500 |
| 5,826,092 | 10/1998 | Flannery | 713/324 |
| 5,878,251 | 3/1999 | Hagiwara et al. | 713/601 |
| 5,894,577 | 4/1999 | MacDonald et al. | 710/260 |
| 5,900,757 | 5/1999 | Aggarwal et al. | 327/198 |
| 5,907,685 | 5/1999 | Douceur | 709/248 |
| 5,996,084 | 11/1999 | Vaughn | 713/323 |

*Primary Examiner*—Ayaz R. Sheikh
*Assistant Examiner*—Frantz Blanchard Jean
*Attorney, Agent, or Firm*—Conley, Rose & Tayon, P.C.; Michael F. Heim; Jonathan M. Harris

[57] ABSTRACT

A computer system includes bridge logic that couples peripheral devices to a CPU and main memory and includes power management logic and a programmable interrupt controller. The power management logic includes control logic, a stop clock register, an alternate stop clock register, and a wakeup event register. The operating system initiates a transition to a lower power mode of operation by issuing an IDLE call to the BIOS which responds by configuring a modulation value of 15 into the alternate stop clock register. With a modulation value of 15, the SLEEPREQ signal is continuously asserted disabling the CPU's internal clock. When a subsequent wakeup event occur, an enable bit in the alternate stop clock register is cleared, disabling modulation and deasserting SLEEPREQ. In response to the wakeup event, the amount of SLEEPEQ modulation is changed. Preferably the modulation value is changed to 14 so that SLEEPREQ is asserted for 14 out of every 15 cycles of a 32 KHz clock. The wakeup event register is configured to disable the system timer from being again causing a wakeup event. If a subsequent wakeup event is then detected, either the enable bit in the alternate stop clock register is cleared to disable SLEEPREQ modulation or the modulation value is programmed to a value of 0. If the enable bit is cleared, SLEEPREQ modulation is determined by the modulation value in a secondary stop clock register.

31 Claims, 3 Drawing Sheets

SMART BATTERY POWER MANAGEMENT IN A COMPUTER SYSTEM

BACKGROUND OF THE INVENTION

1. Field of the Invention

The present invention relates generally to power management in a computer system and more particularly to power management in a portable, battery operated computer. More particularly, the invention relates to dynamically adjusting the CPU's internal clock.

2. Background of the Invention

Computer systems, which are generally microprocessor-based, programmable electronic devices which retrieve, store, and process data, rely heavily on the quantity of available electric energy, especially portable computer systems. A computer generally receives electric energy from one or more of a variety of sources, including the alternating current (AC) provided by a wall socket, the direct current (DC) provided by a battery, or even "solar" power provided by photovoltaic cells. Because computers typically require a DC energy source, a computer receiving energy from an AC energy source will generally convert the alternating current to direct current via special power supply circuitry.

Electric power, defined as the rate at which electric energy is delivered from an energy source, is a key factor in the level of complexity a computer system can attain, because each component inside a computer requires a minimum level of electric power to operate. In particular, transistors comprise a major portion of the components in modem computers and thus largely affect computer power requirements. A typical personal computer with 16 megabytes (MB) of dynamic random access memory (DRAM), or approximately 16 million memory storage locations, may have about 150 million transistors, 140 million of which are used for the DRAM. A personal computer with 64 MB of DRAM will typically require over 520 million transistors for DRAM alone. Consequently, a computer with a greater number of components will consume (or "draw") more power. Other computer components require significant amounts of power, as well, including the computer display and also moving components such as hard disk drives, floppy disk drives, tape drives, and compact disc drives. Ultimately, every electrical or moving component draws electric power and contributes to the total energy consumption of the computer system.

While it is generally possible to construct a power supply capable of meeting the power demands of most computer systems, delivering excessive levels of power creates a number of detrimental side effects. For one, most electrical components dissipate spent electrical energy as heat. Since electric power represents the rate of energy consumption, devices which draw more power use more energy in a given time period, dissipating heat at a faster rate. To avoid overheating from power dissipation, many computer components are constructed with heat sinks to channel the heat away from the device. Most larger computer systems, such as desktop and portable laptop computers, additionally utilize fans to direct air currents over the components and heat sinks, channeling the heat into the air outside the computer enclosure. However, as computer system complexity continues to rise, it becomes harder to remove the heat generated by the increasing number of electrical components.

Another important consequence of excessive power consumption is that higher power levels, by definition, require a given amount of electric energy in a shorter amount of time. Hence, computer systems, which may range from handheld calculators and electronic games to personal computers and even massive computing systems, require a greater total energy reserve to produce the increased level of power required to meet increasing demands on operating complexity. For computer systems which draw electric power from AC current provided by an electric utility company, increased power elevates the total amount of energy consumed and, thus, the cost of operation. Battery-powered devices, however, such as portable computers and cellular telephones, are inherently limited to using that energy which can be contained in the battery. Because the energy capacity of a battery directly determines the duration over which such a device can operate, it is necessary to increase battery capacity and/or reduce consumed power (or "battery drain") in order to allow such devices to operate for an adequate length of time.

In general, increasing the energy storage capacity of a battery increases the size and/or density of the battery material. Because batteries are primarily used in portable devices having limited space and weight requirements, however, it is not often permissible to enlarge portable batteries to hold significant amounts of energy. In fact, although advances in battery technology continue to improve the capacity and efficiency of portable batteries, some portable computer systems are unable to operate for sufficiently long periods of time. While some laptop personal computers may accommodate special batteries which operate for significant lengths of time without recharging, such batteries often make the computer too heavy to carry. Many typical laptop computers, on the other hand, hold lighter but less powerful batteries which are not able to provide even a full business day of operation. Smaller devices like palmtop computers and cellular phones typically have even smaller size requirements than do laptop computers and therefore must accommodate even smaller, lower-capacity batteries. Consequently, such devices may operate for relatively short lengths of time, often only a few hours of talk time for typical portable cellular handsets.

A number of methods have been proposed to reduce the battery drain of portable computer systems and thereby lengthen operation time. Integrated circuits made from semiconductor materials have been developed which contain the transistor components used by computer systems and use a reduced-voltage power supply to decrease battery drain. However, the elevating demands on transistor switching times coupled with the increasing complexity of these semiconductor devices tends to somewhat offset the power-savings of such methods.

In addition to power efficiency improvements in computer components, numerous computer operating protocols have enabled personal computer systems to shut off or reduce power during periods of inactivity. Some computers can detect a sustained period of inactivity by the user, for instance, at which point a "sleep" mode begins. During sleep mode, the computer may cause the hard drive to "spin down," stopping the rotation of the hard drive's magnetic disks to reduce power. Similarly, the computer may place the monitor into a special, low-power standby mode or even switch the monitor completely off. Until the user "wakes" the computer by activating a keyboard or mouse, the computer can operate at a slightly reduced power level. Many cellular and cordless phone handsets switch into a similar type of battery-saving sleep mode upon termination of each phone call. Unless otherwise activated by the user, many of these mobile handsets operate with minimum functionality between calls, awakening periodically to monitor a communications channel for incoming calls.

Many portable, battery operated computers (referred to herein as "laptop" computers) include a CPU that can be put to "sleep." Most CPU's, such as the Pentium® Pro processor, operate from an internal clock signal generated from an externally provided clock. The clock signal synchronizes the processing that occurs inside the CPU. The Pentium® Pro processor, for example, includes a BCLK input pin which is driven by a clock signal. A clock signal is an electrical signal that varies cyclically between two voltage levels. That is, the clock changes from a low voltage level to a high voltage level and back to a low voltage (one "cycle") and then repeats that process over and over. A clock signal has a "frequency" which is defined as the number of cycles the signal experiences in one second. The BCLK input signal to the Pentium® Pro processor may have a frequency, for example, of 66 MHz (66 megahertz or 66 million cycles per second, 1 Hz=1 cycle per second). Most computers include many clock signals with the same or different frequencies for coordinating the activities of the computer. The present invention focuses on the CPU's clock signal and manipulates that clock to save battery power.

Most CPU's receive a clock signal at one frequency and, from that clock signal, internally generate another clock signal usually with a much higher frequency. Computers with the Pentium® Pro CPU, for example, may drive a 66 MHz clock into the BCLK input pin of the CPU, but the CPU internally generates another clock signal at a much higher frequency, for example 233 MHz.

The electrical devices (i.e., "chips"), including the CPU, in most computer systems typically are constructed from complementary metal oxide semiconductor (CMOS) material. It is generally known that CMOS devices use (or dissipate) most of their electrical power during the transitions of the clock signal which drives the device. Other types of semiconductor technology may exhibit this characteristic as well. Thus, power can be saved if the frequency of a clock signal, in this case the CPU clock, can be reduced. Some computers are capable of turning off the CPU clock for brief periods of time in an attempt to save battery charge. Such computers, however, generally do not maximize the period of time during which the CPU clock is disabled. As such, most computers do not maximize the amount of power savings that might be possible by manipulating the CPU clock.

For the foregoing reasons, a laptop computer system that includes a mechanism to reduce the frequency of the CPU clock, or turn off the CPU clock completely during periods of inactivity would greatly reduce the power drain on the computer's battery. Such a computer preferably would turn off the CPU clock as often and as long as possible, thereby minimizing the drain on the battery and maximizing power savings.

SUMMARY OF THE INVENTION

Accordingly, there is provided herein a computer system including bridge logic that couples peripheral devices to a CPU and main memory. The bridge logic preferably includes power management logic and a programmable interrupt controller that are used to adjust dynamically the CPU's internal clock in accordance with the general activity level of the computer. The power management logic includes control logic, and stop clock, alternate stop clock, and wakeup event programmable registers. The alternate stop clock register includes an enable bit that can be configured to enable or disable SLEEPREQ modulation. The amount of modulation, when the enable bit is set, is determined by the value programmed into four modulation bits in the alternate stop clock register. These four modulation bits can be programmed to a value from 0 to 15. The value of the modulation bits represents the number of cycles during which the bridge logic unit asserts SLEEPREQ out of every 15 cycles of a clock signal that preferably has a frequency of 32 KHz. A modulation value of 14, for example, specifies that the bridge will assert SLEEPREQ for 14 out of every 15 cycles of the 32 KHz clock signal.

The bridge logic described above preferably is a "South bridge" and connects to a "North bridge" by way of a primary expansion bus. The North bridge also connects to the CPU and main memory and asserts a STOPCLK signal to the CPU in response to receiving a SLEEPREQ signal from the South bridge. In response to STOPCLK, the CPU disables its internal CPU clock. The South bridge is capable of modulating the SLEEPREQ to control the CPU clock and thus adjust the power drain on the computer's battery.

In accordance with the preferred embodiment, the computer's operating system initiates a transition to a lower power mode of operation by issuing an IDLE call to the BIOS which responds by configuring a modulation value of 15 in the alternate stop clock register. With a modulation value of 15, the SLEEPREQ signal is continuously asserted and the CPU's internal clock is disabled. When a subsequent wakeup event occur, the enable bit in the alternate stop clock register is cleared, disabling modulation and deasserting SLEEPREQ. Preferably the amount of SLEEPREQ modulation is then changed to a value of 14 so that SLEEPREQ is asserted for 14 out of every 15 cycles of a 32 KHz clock. The wakeup event register is then configured to disable the system timer from again causing a wakeup event. If another wakeup event (not caused by the system timer) is then detected, either the enable bit in the alternate stop clock register is cleared to disable SLEEPREQ modulation or the modulation value is programmed to a value of 0. If the enable bit is cleared, SLEEPREQ modulation is determined by the modulation value in the stop clock register. Thus by detecting when wakeup events occur, if at all, the computer is able to adjust dynamically the modulation level for the CPU's internal clock to reduce power consumption as much as possible.

Thus, the present invention comprises a combination of features and advantages that enable it to substantially advance the art by providing a dynamically adjustable CPU clock. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

Figure 1:
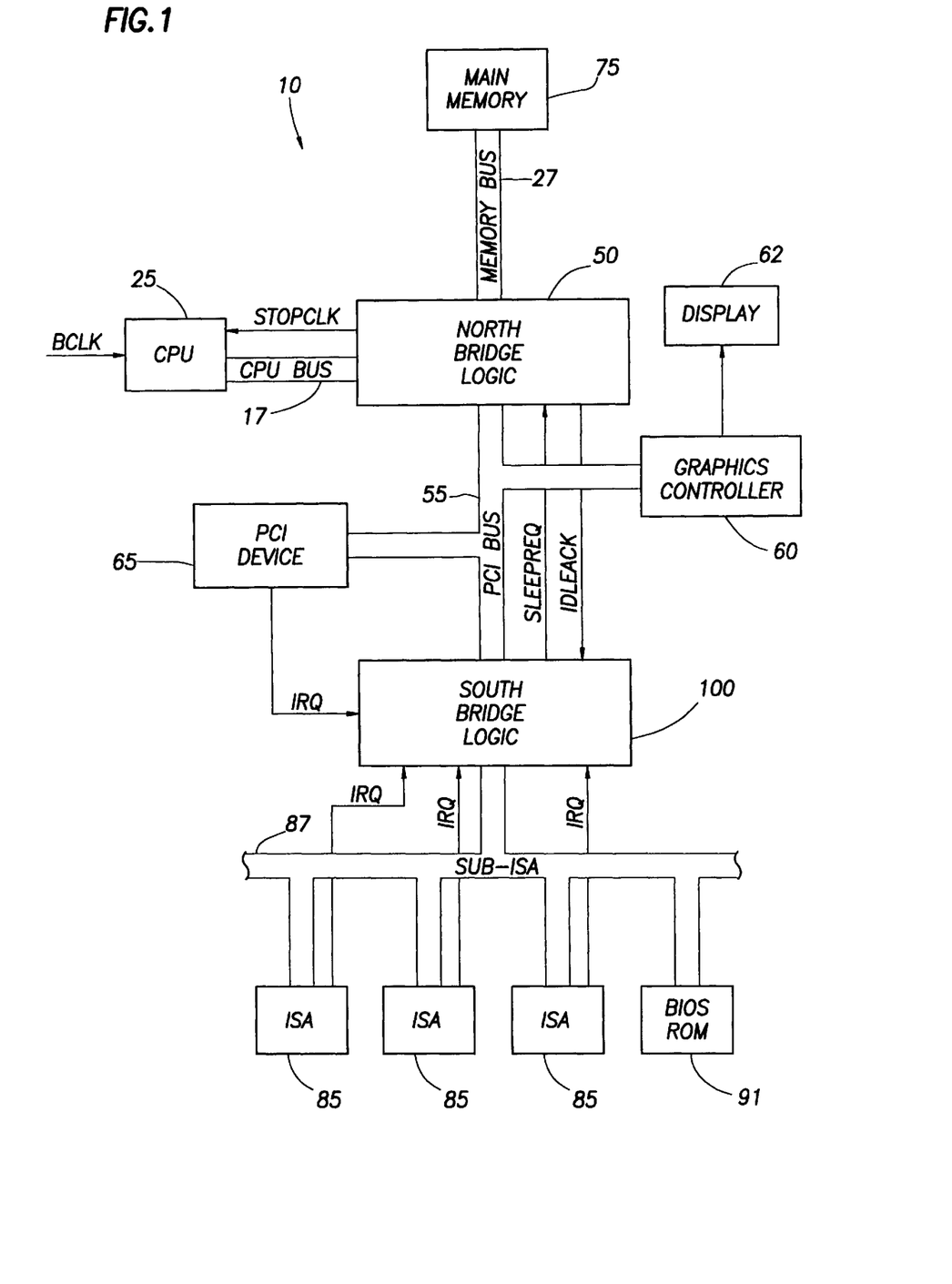
FIG. 1 is a computer system constructed in accordance with the preferred embodiment.

Referring now to FIG. 1, a computer system 10 constructed in accordance with the preferred embodiment generally includes a processor or CPU 25 coupled to a main memory array 75 and a variety of other peripheral computer system components through an integrated bridge logic device 50. As depicted in FIG. 1, the bridge logic 50 sometimes is referred to as a "North bridge" simply because it is shown at the upper end of the system level block diagram. The CPU preferably couples to North bridge 50 via a CPU bus 17. Alternatively, the North bridge 50 may be integrated into the CPU 25. The CPU 25 may comprise any suitable processor such as, for example, a Pentium® Pro microprocessor. It should be understood, however, that other alternative types of microprocessors could be employed. Further, an embodiment of computer system 10 may include multiple processors, with each processor coupled through the CPU bus 17 to the North bridge 50.

The main memory array 75 preferably couples to the bridge logic unit 50 through a memory bus 27, and the North bridge 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 coupled to the bridge logic 50 via an expansion bus 55 as shown in FIG. 1. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into an out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 75. As will be apparent to one skilled in the art, the North bridge 50 includes a PCI interface to permit master cycles to be initiated and received by the North bridge. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 55 comprises a Peripheral Component as Interconnect (PCI) bus. The present invention, however, is not limited to any particular type of expansion bus, and thus various busses may be used including a high speed (66 MHz or faster) PCI bus.

In the preferred embodiment, a plurality of PCI peripheral devices reside on the PCI bus 55. The PCI devices generally may include any of a variety of peripheral devices such as, for example, network interface cards (NIC's), video accelerators, audio cards, hard or floppy disk drives, PCM-CIA drives, Small Computer Systems Interface ("SCSI") adapters and telephony cards. Although only two peripheral devices, graphics controller 60 and PCI peripheral device 65, are depicted in FIG. 1, it should be recognized that computer system 10 may include any number of PCI devices as desired.

The present invention addresses the problem of saving as much battery power as possible. Because saving battery power is a problem pertaining mostly to laptop computers, computer system 10 generally reflects a laptop computer. The principles of the present invention, however, are applicable as well to desktop computer systems or other portable types of electronic devices such as hand-held computers and digital pagers. Further, the embodiment described herein assumes expansion bus 55 represents a PCI bus, as shown in FIG. 1, and thus the following discussion will focus on configuring the present invention for that embodiment. Additionally, CPU 25 preferably comprises a Pentium® Pro processor and thus CPU bus 17 represents a Pentium® Pro bus. These bus protocols and the terminology used with respect to these protocols are well known to those of ordinary skill in the art. If a more thorough understanding of the PCI, or Pentium® Pro bus is desired, reference should be made to the *PCI Local Bus Specification* (1995), and *Intel P6 External Bus Specification*. If an AGP bus also is used in the computer system, reference may be made to the *Accelerated Graphics Port Interface Specification* (Intel, 1996) for additional information.

Referring still to FIG. 1, another bridge logic device 100 also preferably connects to expansion bus 55. This bridge device 100 (which sometimes is referred to as a "South bridge" because it is shown below the North bridge) couples or "bridges" the primary expansion bus 55 to one or more secondary expansion busses. These other secondary expansion busses may include an Industry Standard Architecture (ISA) bus, a Universal Serial Bus (USB), an IDE bus, an IEEE 1394 standard (or "fire wire") bus, or any of a variety of other busses that are available or may become available in the future. In the preferred embodiment of FIG. 1, the South bridge 100 couples to a sub-ISA bus 87, but may couple to additional busses as well. Bus 87 is referred to as "sub-ISA" because it is a subset of the ISA bus. For example, the sub-ISA bus is an eight bit bus where as an ISA bus is a 16 bit bus. Connections to other busses are not shown in FIG. 1 for sake of clarity. The sub-ISA bus 87 couples a variety of ISA compatible devices 85 to the South bridge 100. These ISA devices 85 may comprise a keyboard, a mouse, a modem, or other ISA compatible devices as desired. The ISA 87 comprises a Basic Input/Output System Read Only Memory (BIOS ROM) 91. The BIOS ROM contains firmware that is copied to main memory 75 and executed by the CPU. The BIOS code handles low-level input/output transactions to the various peripheral devices such as the hard disk drive. For example, the BIOS executes the power on self test ("POST") during system initialization ("boot up"). The BIOS also is responsible for loading the operating system into the computer's main system memory.

Several signals are illustrated in FIG. 1 that are relevant to the present invention. Many of the peripheral devices assert interrupt request signals (identified as IRQ signals in FIG. 1) when the device has information to share with the CPU such as keyboard information. As shown in the preferred embodiment of FIG. 1, the IRQ's are provided to the South bridge 100. Each interrupt request line uniquely identifies a specific request for service.

The clock signal provided to the CPU 25 is labeled BCLK. The CPU includes an internal clock generator unit that generates one or more internal clock signals with frequencies that preferably are greater than that of BCLK. The internal CPU clocks may have frequencies of 200 MHz or higher.

A pair of signals, labeled SLEEPREQ and IDLEACK in FIG. 1, connect between the North and South bridges 50, 100. Many other signals, besides those shown, may connect between the South and North bridges but are omitted from Figure for sake of clarity. The South bridge asserts SLEEPREQ when, in accordance with the smart power management protocol described below, it is determined that the CPU clock should be turned off. The North bridge 50 responds to the SLEEPREQ signal by asserting STOPCLK to the CPU which generally responds by turning off its internal clock. If implemented as a Pentium® Pro processor, the CPU 25 preferably disables its internal clock to all logic units within the CPU except its interface unit (not shown) to CPU bus 17, a timestamp counter and an Advanced Programmable Interrupt Controller (APIC). The CPU 25 will still snoop memory accesses as is generally known by those of ordinary skill in the art. Once the clock internal to the CPU is stopped, the CPU runs a Stop Grant Acknowledge transaction cycle on the CPU bus 17 to the North bridge 50. The North bridge then responds by asserting IDLEACK back to the South bridge to indicate to the South bridge that the CPU has stopped its internal clock. The South bridge 100 deasserts SLEEPREQ when desired to restart the CPU clock. Once SLEEPREQ is deasserted by the South bridge, the North bridge 50 deasserts STOPCLK to the CPU which then restarts its internal clock.

Figure 2:
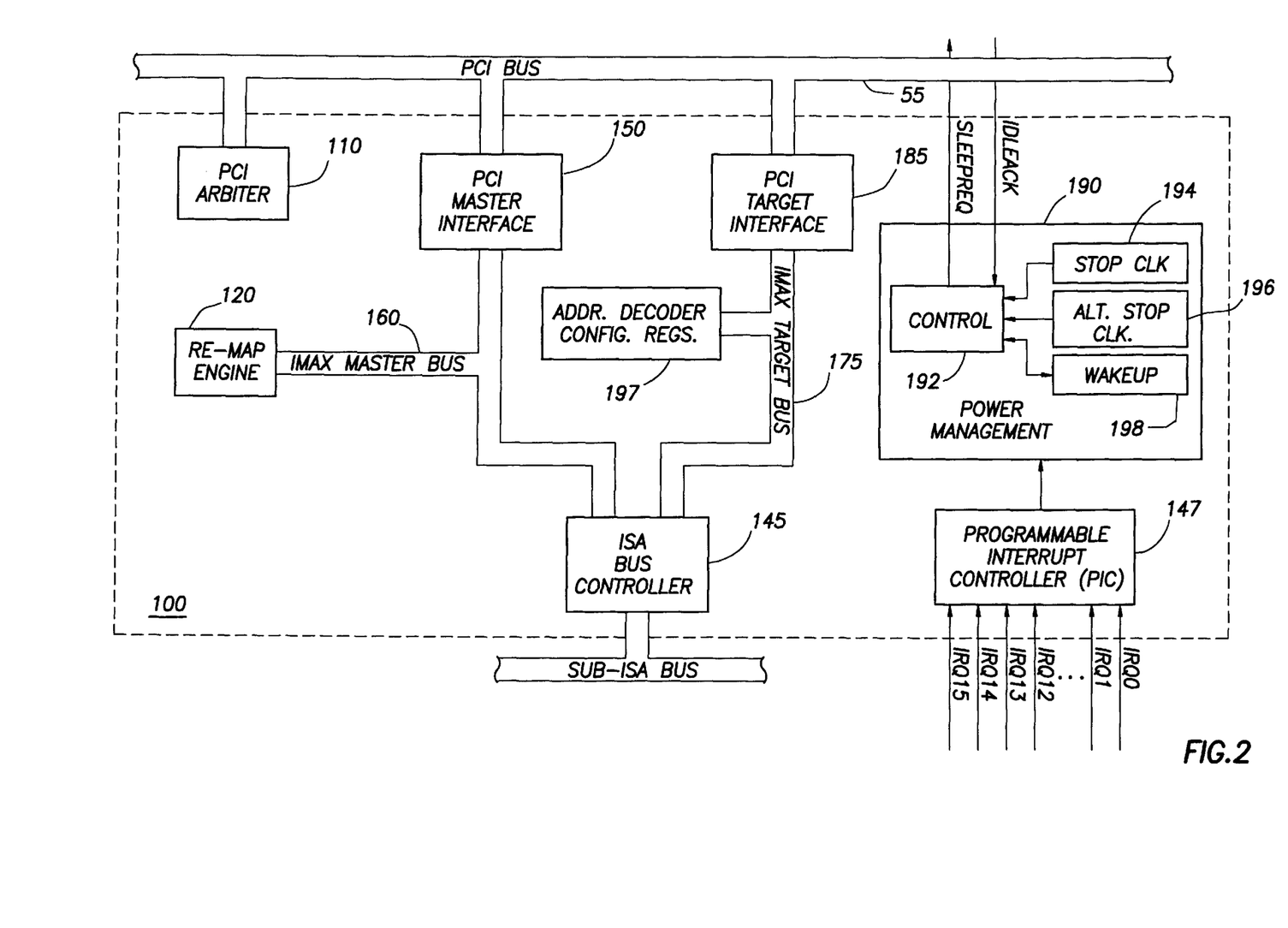
FIG. 2 is a block diagram of a bridge device of the computer system of FIG. 1 including logic for controlling the CPU clock.

Referring now to FIG. 2, the South bridge 100 of the present invention is depicted conceptually to illustrate certain aspects of the present invention. As shown, the South bridge preferably includes a re-map engine 120, an ISA bus controller 145, a programmable interrupt controller (PIC) 147, a PCI arbiter 110, a PCI bus master interface 150, a PCI target interface 185, a power management logic unit 190, and address decoder and configuration registers 197. The PCI bus master interface 150 couples South bridge devices capable of running master cycles to the PCI bus 55. The South bridge also includes an IMAX (Internal Modular ASIC EXpansion) master bus 160 coupling the PCI bus master interface 150 to various internal master devices such as ISA bus controller 145. Other internal master devices, besides ISA bus controller 145 may be included but are not shown in FIG. 2 for sake of clarity.

Although FIG. 2 shows the South bridge 100 connecting to a PCI bus, it should be understood that expansion bus 55 may comprise any type of system bus capable of use in a computer system. Thus, for example, expansion bus 55 may comprise an IEEE standard 1394 (fire wire) bus, or any other suitable bus. Similarly, while bus master interface device 150 is shown as a PCI master, master interface 150 may be modified for use with other bus standards. The only requirement is that master interface must be capable of running master cycles on the expansion bus.

The PCI target interface 185 monitors PCI bus cycles and determines when to respond. In the preferred embodiment, the PCI target interface 185 couples to an internal address decoder and configuration registers 197. The configuration registers are used, among other things, to determine if the South bridge 100 should respond to addresses to internal targets. The PCI target interface 185 couples to an IMAX target bus 175 that transmits inbound address, data and control signals to IMAX targets. Each of the IMAX masters also preferably constitutes a target for the IMAX target interface 185. The ISA bus controller 145 thus functions as both a master and a target and includes connections to both the IMAX master bus 160 and IMAX target bus 175. More information regarding the common target interface for South bridge 100 may be obtained from a commonly assigned and co-pending patent applications entitled, "Computer System With Bridge Logic That Includes An Internal Modular Expansion Bus And A Common Master Interface For Internal Master Devices" and "Computer System With Bridge Logic That Includes An Internal Modular Expansion Bus And A Common Target Interface For Internal Target Devices."

As shown, Power management 190 includes three registers 194, 196, and 198 coupled to and configured by control logic 192. Control logic 192 is responsible for asserting SLEEPREQ and receiving IDLEACK from the North bridge (FIG. 1). Registers 194, 196, and 198 are programmable registers and are used in the implementation of the smart power management protocol of the present invention. Register 196 is the alternate stop clock register and preferably is an eight bit register. Register 196 is referred to as "alternate" because it permits an alternative method of stopping the CPU's internal clock from that provided by the stop clock register 194. The bits included in the alternate stop clock register are defined in Table I.

TABLE I

Alternate Stop Clock Register Bit Definitions

| Bits | R/W? | Description |
| --- | --- | --- |
| 7-5 | R | Reserved |
| 4 | R/W | Alternate SLEEPREQ modulation enable<br>1 - enabled, SLEEPREQ modulation value will be loaded from bits 3-0<br>0 - disabled<br>This bit is cleared on any system wakeup event |
| 3-0 | R/W | 0000 - SLEEPREQ deasserted, CPU running full speed<br>0001-1110 n, SLEEPREQ modulation n/15<br>1111 - SLEEPREQ deasserted and held. North bridge requested to stop running |

Bits 7-5 are reserved for future use as desired. Bit 4 is an enable bit. When bit 4 is 1 the South bridge modulates the SLEEPREQ signal as defined by bits 3-0 as described below. When bit 4 is cleared (set to 0), SLEEPREQ is modulated in accordance with bits 3-0 of the stop clock register 194. Bits 3-0 of the alternate stop clock register specify how SLEEPREQ is to be modulated by the South bridge 100.

In accordance with the preferred embodiment, the South bridge 100 modulates SLEEPREQ by asserting SLEEPREQ for a first period of time and deasserting SLEEPREQ for a second period of time. The amount of modulation is generally the percentage of the total time (first period plus second period) that is taken up by the first period of time in which SLEEPREQ is asserted. In other words, the SLEEPREQ modulation refers to how much time SLEEPREQ is asserted. For example, 50% modulation means SLEEPREQ is asserted half of the time. More specifically, bits 3-0 in the alternate stop clock register represent modulation bits that define a modulation value n that specifies the number of cycles that SLEEPREQ is asserted out of every 15 cycles any suitable clock signal which preferably is a general purpose 32 kHz clock (not shown). The 32 kHz, or other desired frequency, clock signal is a clock signal generated internally to computer system 10. For example, a modulation value n of 0011 (binary number 3) defines a modulation of 3/15, thus the South bridge 100 asserts SLEEPREQ for three out of every 15 cycles of the 32 kHz clock. The South bridge interprets an n value of 0000 as requiring no modulation (CPU runs at full speed). An n value of 1111 (binary 15) specifies that SLEEPREQ is continually asserted (15 out of every 15 cycles of the 32 kHz clock).

Register 194 is the stop clock register and also is an eight bit register with bit definitions specified in Table II.

TABLE II

Stop Clock Register Bit Definitions

| Bits | R/W? | Description |
|---|---|---|
| 7-5 | R | Reserved |
| 4 | R/W | SLEEPREQ interrupt modulation enable<br>1 - enable a system event, wakeup event or SMI to restart SLEEPREQ modulation<br>0 - disable a system event, wakeup event or SMI to restart SLEEPREQ modulation |
| 3-0 | R/W | 0000 - SLEEPREQ deasserted, CPU running full speed<br>0001-1110 n, SLEEPREQ modulation n/15<br>1111 - SLEEPREQ deasserted and held. North bridge requested to stop running;<br>When these bits are 1111, any system event, when enabled or SMI will clear these bits, SLEEPREQ is modulated by the 32 KHz clock |

Bits 3-0 of the secondary stop clock register 194 define a modulation setting for SLEEPREQ if the enable bit (bit 4) of the alternate stop clock register is cleared. The preferred embodiment uses registers 194 and 196 to modulate SLEEPREQ, and thus the CPU clock, as described below with reference to FIG. 2.

Register 198 is a 16 bit wakeup register. Each bit in this register defines whether an interrupt signal of an associated event is enabled or disabled as a wakeup event. A wakeup event may include an incoming telephone call if the computer has an interface to a telephone line, movement of the mouse or other cursor control device, a signal from a system timer, or other events. Table III below defines the bits and the associated wakeup events for the wakeup register 198.

TABLE III

Wakeup Register Bit Definitions

| Bits | R/W? | Description |
|---|---|---|
| 15 | R/W | 1-Enable IRQ15 as a system wakeup event<br>0-Disable IRQ15 as a system wakeup event |
| 14 | R/W | 1-Enable IRQ14 (IDE hard drive) as a system wakeup event 0-Disable IRQ14 (IDE hard drive) as a system wakeup event |
| 13 | R/W | 1-Enable IRQ13 (coprocessor error) as a system wakeup event 0-Disable IRQ13 (coprocessor error) as a system wakeup event |
| 12 | R/W | 1-Enable IRQ12 (mouse) as a system wakeup event<br>0-Disable IRQ12 (mouse) as a system wakeup event |
| 11 | R/W | 1-Enable IRQ11 as a system wakeup event<br>0-Disable IR11 as a system wakeup event |
| 10 | R/W | 1-Enable IRQ10 as a system wakeup event<br>0-Disable IRQ10 as a system wakeup event |
| 9 | R/W | 1 -Enable IRQ9 as a system wakeup event<br>0-Disable IRQ9 as a system wakeup event |
| 8 | R/W | 1-Enable IRQ8 (RTC) as a system wakeup event<br>0-Disable IRQ8 (RTC) as a system wakeup event |
| 7 | R/W | 1-Enable IRQ7 (LPT1) as a system wakeup event<br>0-Disable IRQ7 (LPT1) as a system wakeup event |

TABLE III-continued

Wakeup Register Bit Definitions

| Bits | R/W? | Description |
|---|---|---|
| 6 | R/W | 1-Enable IRQ6 (floppy) as a system wakeup event<br>0-Disable IRQ6 (floppy) as a system wakeup event |
| 5 | R/W | 1-Enable IRQ5 (LPT2) as a system wakeup event<br>0-Disable IRQ5 (LPT2) as a system wakeup event |
| 4 | R/W | 1-Enable IRQ4 (COM2) as a system wakeup event<br>0-Disable IRQ4 (COM2) as a system wakeup event |
| 3 | R/W | 1-Enable IRQ3 (COM1) as a system wakeup event<br>0-Disable IRQ3 (COM1) as a system wakeup event |
| 2 | R/W | 1-Enable NMI as a system wakeup event<br>0-Disable NMI as a system wakeup event |
| 1 | R/W | 1-Enable IRQ1 (keyboard) as a system wakeup event<br>0-Disable IRQ1 (keyboard) as a system wakeup event |
| 0 | R/W | 1-Enable IRQ0 (system timer) as a system wakeup event<br>0-Disable IRQ0 (system timer) as a system wakeup event |

For example, every time the system timer expires, the timer generates an interrupt request defined as IRQ0. The system timer (which preferably resides internal to the South bridge 100) expires approximately every 55 milliseconds and causes the CPU to update its time of day clock and other general house keeping functions. When IRQ0 is generated by the system timer, the CPU's internal clock must be enabled, if it has been disabled in response to an asserted SLEEPREQ, to service the interrupt, but can immediately thereafter be disabled to save power until the next wakeup event interrupt is generated. The other events that may cause the system to wakeup are defined above in Table III. Bits 9-11 (IRQ9-11) are not associated with any particular wakeup event and thus can be programmed as desired.

Figure 3:
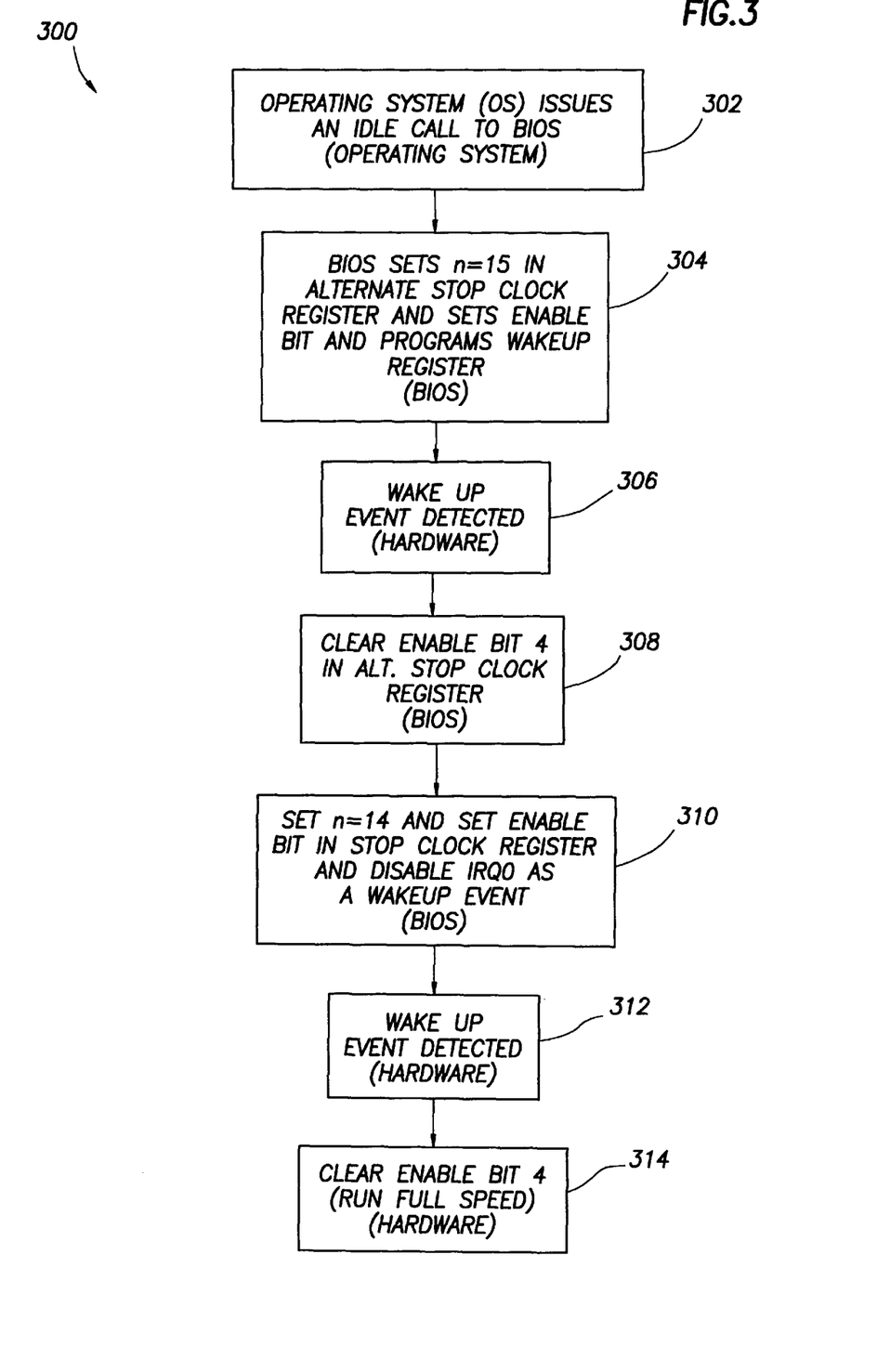
FIG. 3 is a flow chart of an exemplary method for controlling the CPU clock.

The preferred embodiment of the present invention uses the mechanism described above to put the CPU to sleep (i.e., disable its internal clock) as much and as often as possible. The preferred embodiment further permits the CPU clock to be adjusted dynamically to optimize the power savings. The preferred method for optimizing the period of time for dynamically asserting SLEEPREQ is shown in FIG. 3 and will now be described with reference to the block diagrams of the computer system (FIG. 1) and the South bridge (FIG. 2). Each system in FIG. 3 parenthetically includes the entity (e.g., hardware, operating system, BIOS) that preferably performs that step. In step 302, the computer system initiates a transition to a lower power mode in which the CPU clock is disabled. Step 302, for example, specifies that the computer's operating system (which may be the Windows® or other suitable operating system) issues a call to the BIOS code to turn off the CPU clock. If the operating system is Window®, the request to BIOS is an IDLE call. In response, the BIOS code preferably sets the value of n in the alternate stop clock register 196 (bits 3-0) to 1111 (binary 15), thereby asserting SLEEPREQ continuously to the North bridge which responds by asserting STOPCLK. With STOPCLK asserted, the CPU's internal clock is disabled as described previously. In step 304, BIOS also sets the enable bit (bit 4) in the alternate stop clock register 196 and programs the wakeup register 198 to enable or disable each wakeup event. In accordance with the preferred embodiment, all of the IRQ's are enabled as wakeup events in register 198.

Once an interrupt associated with a wakeup event is asserted in step 306, the control logic 192 clears the enable bit (bit 4) in the alternate stop clock register 196 (step 308). With this enable bit cleared, the SLEEPREQ is not modulated in accordance with the value of bits 3-0 in the alternate stop clock register. Instead, SLEEPREQ is modulated in accordance with the value of bits 3-0 in the stop clock register 194. Further, bits 3-0 of the stop clock register 194 may be configured to a setting in which no SLEEPREQ modulation is defined.

In step 310, the BIOS sets bits 3-0 in the alternate stop clock register to a value of 14, sets the enable bit 4 (enabling modulation) and disables IRQ0 as a wakeup event in the wakeup register 198. The IRQ0 can be disabled at this point, because with a modulation n value of 14, SLEEPREQ will be asserted 14 out of every 15 cycles of the 32 KHz clock or $^{14}/_{15}*100=93.3\%$ of the time. Alternatively stated, SLEEPREQ will be deasserted, waking up the CPU clock, one out of every 15 cycles of the 32 KHz clock or $^{1}/_{15}*100=6.7\%$ of the time. Thus, the CPU clock will run at full speed for one cycle (approximately 0.03 milliseconds) out of every 15 cycles (approximately 0.5 milliseconds) of the 32 KHz clock. Thus, the CPU will be awake each time IRQ0 is generated by the system timer (which occurs once every 55 milliseconds). By setting bits 3-0 of the alternate stop clock register to a value of n=14, more battery power is saved than if the CPU was run continuously at full speed when the system timer expired.

When a subsequent wakeup event occurs (step 312), because IRQ0 has been disabled as a wakeup event, the event is determined to be a true wakeup event not a system timer event. A true wakeup event might be, for example, movement of the mouse, activation of a key on the keyboard, or any other event preferably defined in Table III for the wakeup register 198. In step 314, therefore, the enable bit is cleared in the alternate stop clock register to disable SLEEPREQ from being modulated by the n value set in bits 3-0. Instead, SLEEPREQ is modulated, if at all, by the modulation value set in bits 3-0 of the secondary stop clock register 196. Alternatively, rather than clearing the enable bit in step 314, bits 3-0 could be configured from an n value of 14 to an n value of 0000, causing the CPU to run at full speed (no SLEEPREQ modulation).

The preferred method described above in FIG. 3 permits the CPU's internal clock to be dynamically adjusted and turned off as often and as long as possible. Once the first system timer interrupt (IRQ0) occurs, the CPU's clock is restarted long enough to service the request and then the CPU clock is turned off during 14 cycles out of every 15 cycles of a 32 KHz clock. The CPU clock is modulated in this manner until another wakeup event occurs, that is not a system timer interrupt, and then the CPU clock is either run continuously at full speed or modulated in accordance with the stop clock register.

Numerous variations and modifications will become apparent to those skilled in the art once the above disclosure is fully appreciated. It is intended that the following claims be interpreted to embrace all such variations and modifications.

What is claimed:

1. A bridge logic unit, comprising:

a programmable interrupt controller receiving at least one interrupt request signal; and a power management logic unit coupled to said programmable interrupt controller and capable of asserting a SLEEPREQ signal that causes a CPU clock to be turned off when SLEEPREQ is asserted;

said power management logic unit comprising a first programmable CPU stop clock register including modulation bits by which the SLEEPREQ signal is dynamically modulated so that the SLEEPREQ signal is asserted only for a programmed number of cycles of a clock signal and a second programmable CPU stop clock register including modulation bits by which the SLEEPREQ signal is dynamically modulated so that the SLEEPREQ signal is asserted only for a programmed number of cycles of said clock signal when said SLEEPREQ signal is not being modulated by said first programmable CPU stop clock register, said programmed number of cycles defined by the value of said modulation bits of each of said stop clock registers.

2. The bridge logic unit of claim 1 wherein the value of said modulation bits of said first programmable CPU stop clock register is changed when a wakeup event is detected.

3. The bridge logic unit of claim 2 wherein said power management logic unit also includes a programmable wakeup register wherein each bit is configured to enable or disable a particular event as being an event to cause said CPU clock to be enabled.

4. The bridge logic unit of claim 2 wherein the value of said modulation bits in said first CPU stop clock register are configured to cause said CPU clock to be disabled until said programmable interrupt controller detects an asserted interrupt request signal identifying a wakeup event.

5. The bridge logic unit of claim 3 wherein said modulation bits in said first CPU stop clock register comprise 4 bits that define a value is in the range of 0 to 15 where n represents the number of cycles that SLEEPREQ is asserted out of every 15 cycles of said clock signal.

6. The bridge logic unit of claim 4 wherein said first CPU stop clock register also includes an enable bit that causes said modulation of said SLEEPREQ signal to be disabled when cleared or enabled when set, and when said enable bit is set said SLEEPREQ modulation is determined by the value of n defined by said modulation bits.

7. The bridge logic unit of claim 5 wherein said modulation bits in said first CPU stop clock register are configured for an n value of 15 until said programmable interrupt controller detects an asserted interrupt request signal.

8. The bridge logic unit of claim 7 wherein said modulation bits in said first CPU stop clock register then are reconfigured for an n value of 14 until said programmable interrupt controller detects a subsequent asserted interrupt request signal.

9. The bridge logic unit of claim 8 wherein a bit in said wakeup register corresponding to a system timer is cleared to disable said system timer as being a wakeup event.

10. The bridge logic unit of claim 8 wherein said modulation bits in said first CPU stop clock register are reconfigured for an it value of 0 when said programmable interrupt controller detects a subsequent asserted interrupt request signal.

11. The bridge logic unit of claim 8 wherein said first CPU stop clock register also includes an enable bit that causes said modulation of said SLEEPREQ signal to be disabled when cleared and said enable bit is cleared when a subsequent wakeup event is detected by said programmable interrupt controller.

12. The bridge logic unit of claim 1 wherein said second CPU stop clock register is configured to modulate SLEEPREQ signal when an enable bit in said alternate first stop clock register is cleared.

13. A computer system, comprising:

a CPU including an internal CPU clock signal that can be enabled or disabled by a STOPCLK signal provided to said CPU;

a main memory device;

a primary expansion bus;

a North bridge coupling together said CPU, said main memory device, and said primary expansion bus; and a South bridge coupling a secondary expansion bus to said primary expansion bus, said South bridge including:

a programmable interrupt controller receiving at least one interrupt request signal defining a wakeup event that causes said CPU clock to be enabled; and a power management logic unit coupled to said programmable interrupt controller and capable of asserting a SLEEPREQ signal to said North bridge that responds by asserting said STOPCLK signal to said CPU to disable said CPU clock;

said power management logic unit comprising a programmable alternate CPU stop clock register including bits by which the SLEEPREQ signal is dynamically modulated so that the SLEEPREQ signal is asserted only for a programmed number of cycles of a first clock signal, said programmed number of cycles defined by the value of said modulation bits.

14. The computer system of claim 13 wherein the value of said modulation bits is changed when a wakeup event is detected.

15. The computer system of claim 14 wherein said power management logic unit also includes a programmable wakeup register wherein each bit is configured to enable or disable a particular event as being an event to cause said CPU clock to be enabled.

16. The computer system of claim 14 wherein the value of said modulation bits is configured to cause said CPU clock to be disabled until said programmable interrupt controller detects an asserted interrupt request signal identifying a wakeup event.

17. The computer system of claim 15 wherein said modulation bits in said alternate CPU stop clock register comprise 4 bits that define a value n in the range of 0 to 15 where n represents the number of cycles that SLEEPREQ is asserted out of every 15 cycles of said first clock signal.

18. The computer system of claim 17 wherein said alternate CPU stop clock register also includes an enable bit that causes said modulation of said SLEEPREQ signal to be disabled when cleared or enabled when set, and when said enable bit is set said SLEEPREQ modulation is determined by the value of n defined by said modulation bits.

19. The computer system of claim 17 wherein said modulation bits are configured for an n value of 15 until said programmable interrupt controller detects an asserted interrupt request signal.

20. The computer system of claim 19 wherein said modulation bits then are reconfigured for an n value of 14 until said programmable interrupt controller detects a subsequent asserted interrupt request signal.

21. The computer system of claim 20 wherein a bit in said wakeup register corresponding to a system timer is cleared to disable said system timer as being a wakeup event.

22. The computer system of claim 20 wherein said modulation bits are reconfigured for an n value of 0 when said programmable interrupt controller detects a subsequent asserted interrupt request signal.

23. The computer system of claim 20 wherein said alternate CPU stop clock register also includes an enable bit that causes said modulation of said SLEEPREQ signal to be disabled when cleared and said enable bit is cleared when a subsequent wakeup event is detected by said programmable interrupt controller.

24. A method for controlling the power drain in a computer system, comprising:

initiating a low power mode of operation by asserting a SLEEPREQ signal to cause a CPU clock to be disabled;

detecting a first wakeup event;

modulating said SLEEPREQ signal to cause said CPU clock to be disabled while said SLEEPREQ is asserted and enabled while said SLEEPREQ is deasserted;

disabling a system timer event from being a wakeup event; and changing the amount of modulation of said SLEEPREQ signal when a second wakeup event is detected.

25. The method of claim 24 wherein said step of modulating said SLEEPREQ signal includes configuring a programmable alternate stop clock register.

26. The method of claim 24 wherein said step of modulating said SLEEPREQ signal includes programming 4 bits in an alternate programmable stop clock register for a value of n to cause said SLEEPREQ signal to be asserted for n cycles out of every 15 cycles of a first clock signal.

27. The method of claim 26 wherein said step of modulating said SLEEPREQ signal includes programming an n value of 14 into said alternate stop clock register.

28. The method of claim 24 wherein said step of changing the amount of modulation includes changing the value of n in said alternate stop clock register.

29. The method of claim 24 wherein said step of changing the amount of modulation includes programming an n value of 0 into said alternate stop clock register.

30. The method of claim 24 wherein said step of changing the amount of modulation includes disabling said modulation and continuously asserting said SLEEPREQ signal.

31. The method of claim 24 wherein said step of changing the amount of modulation includes modulating said SLEEPREQ signal in accordance with a modulation value programmed into a secondary stop clock register.

* * * * *